July 18, 1933. LA VERNE C. STURGIS 1,918,939
EGG TURNING MECHANISM FOR INCUBATORS
Filed Sept. 26, 1930 3 Sheets-Sheet 1
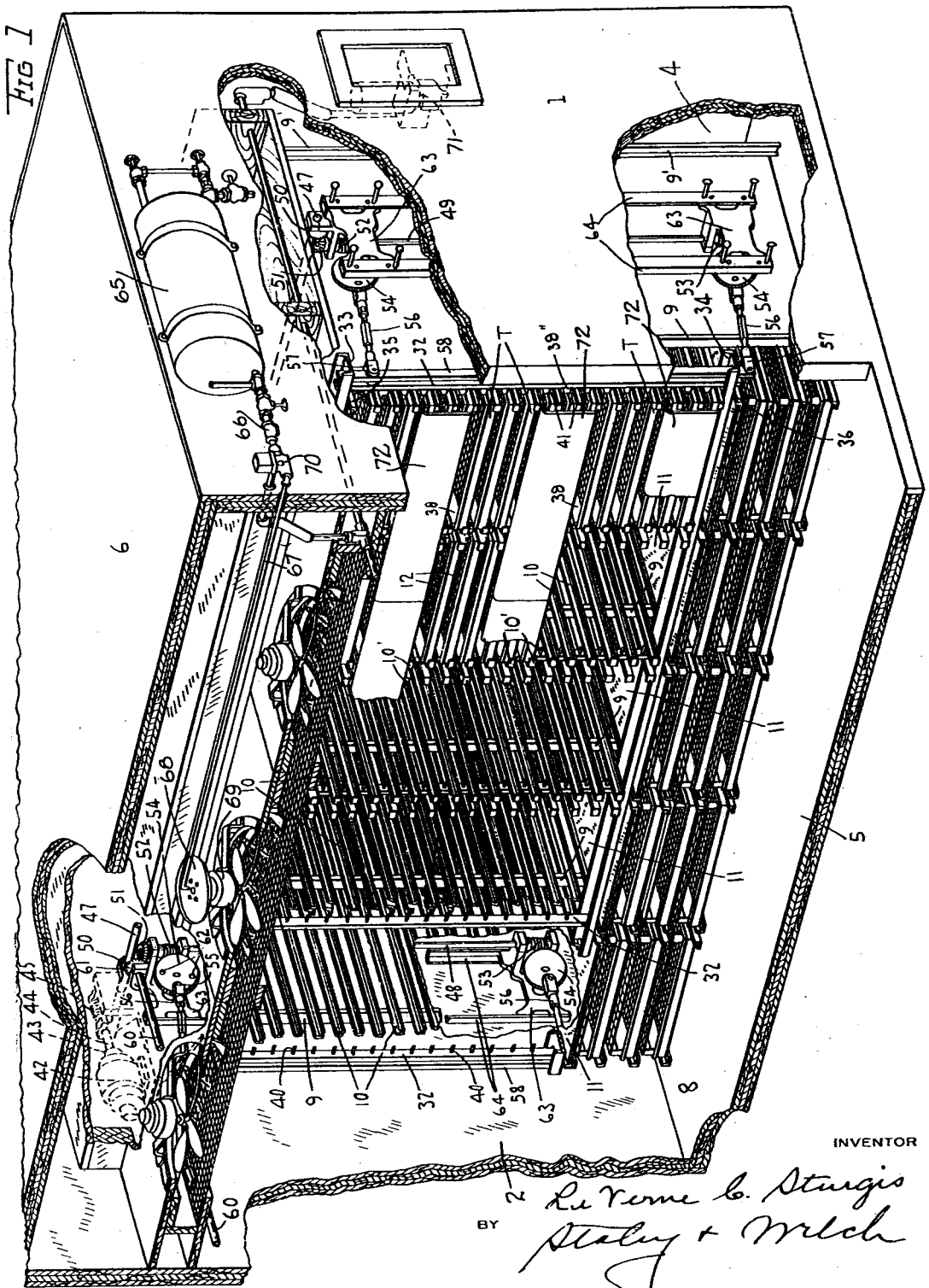
INVENTOR
La Verne C. Sturgis
BY
Staley + Welch
ATTORNEYS

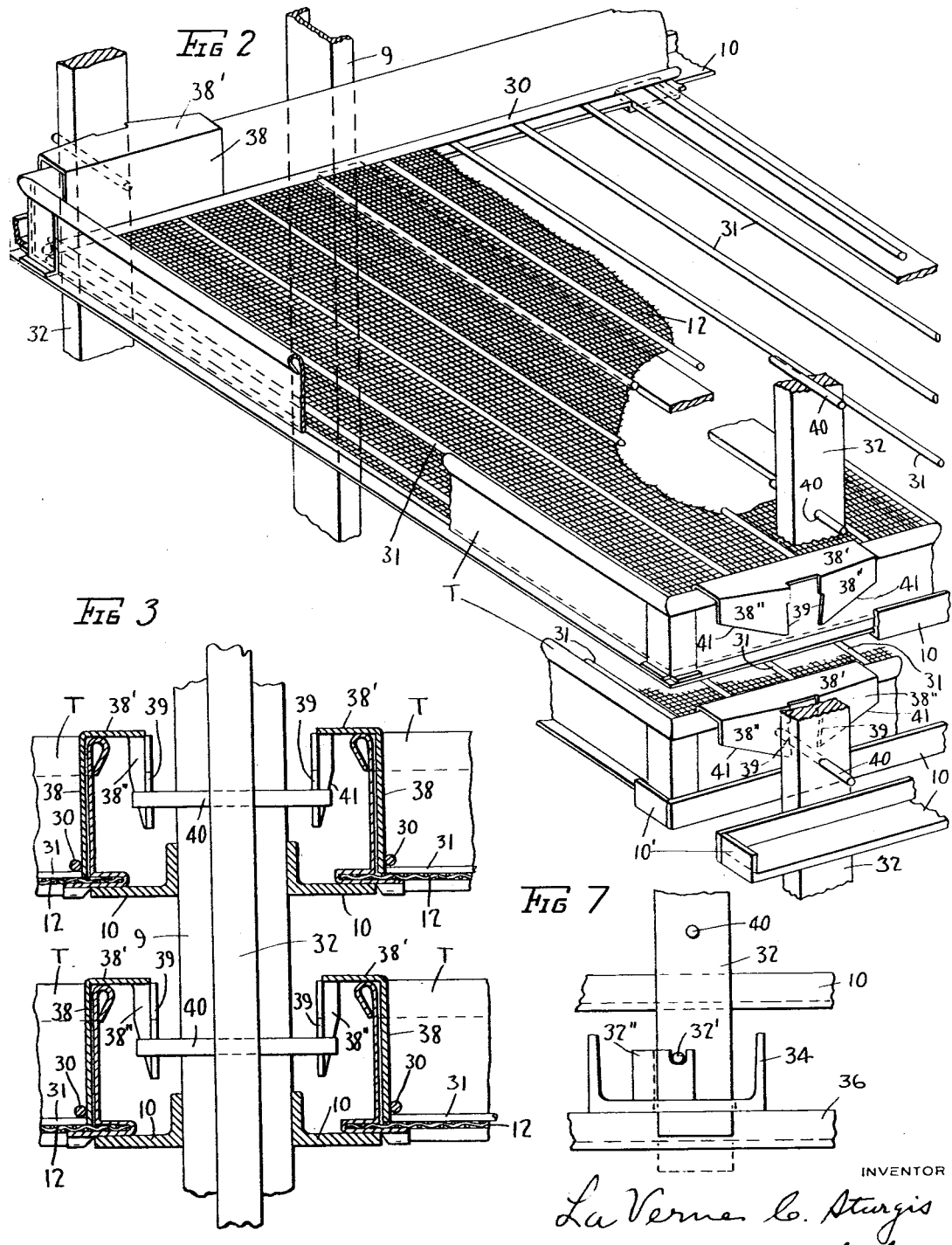

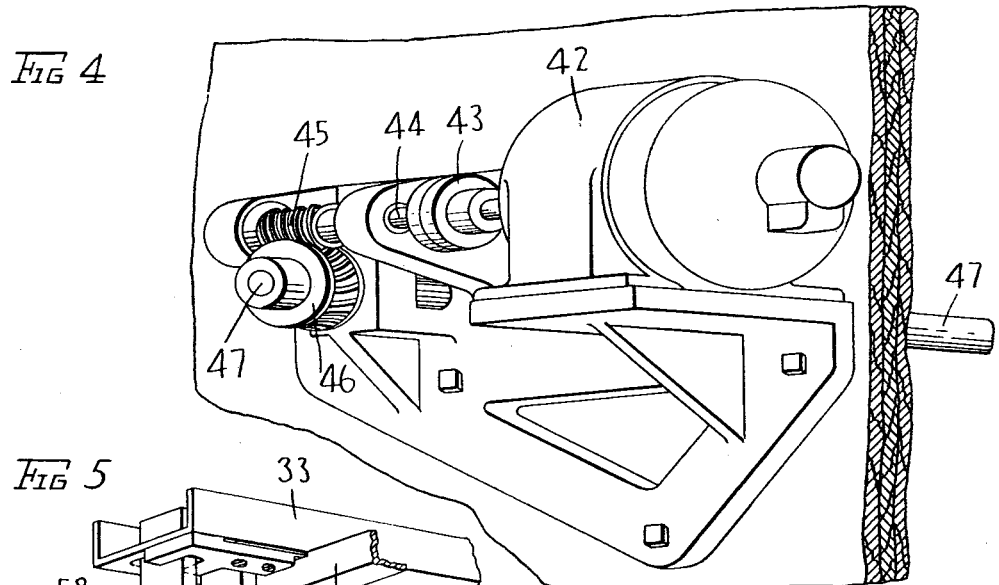
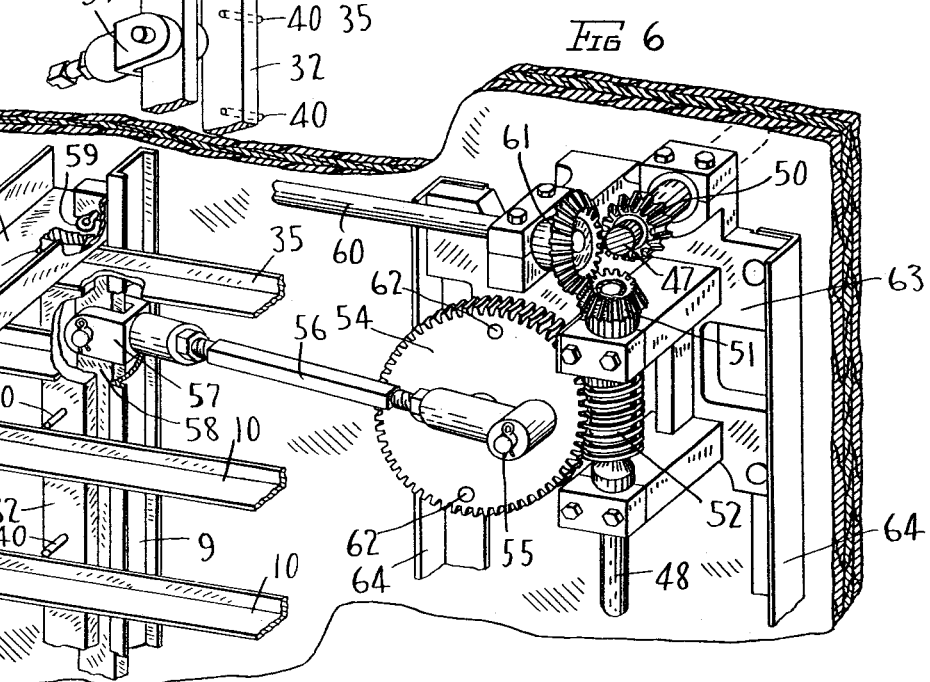

Patented July 18, 1933

1,918,939

UNITED STATES PATENT OFFICE

LA VERNE C. STURGIS, OF SPRINGFIELD, OHIO, ASSIGNOR TO THE BUCKEYE INCUBATOR MANUFACTURING COMPANY, OF BEACHWOOD, OHIO, A CORPORATION OF OHIO

EGG TURNING MECHANISM FOR INCUBATORS

Application filed September 26, 1930. Serial No. 484,617.

This invention relates to improvements in egg turning mechanism for incubators, it more particularly relating to devices for simultaneously turning the eggs in a large number of trays in a mammoth incubator.

One of the objects of my invention is to provide egg turning mechanism of the character referred to which will be simple in construction and effective in operation.

Another object of the invention is to provide egg turning mechanism which may be simultaneously disengaged from all of the egg turning devices proper of a plurality of trays: a further object of this invention being to provide for individually disengaging the turning device in each tray from the mechanism.

A further object of the invention is to provide means whereby any individual turning device may be automatically connected with the turning mechanism upon a movement of the turning mechanism in the event that it should have been left inadvertently disengaged therefrom.

Referring to the drawings:

Fig. 1 is a perspective view of a portion of an incubator showing my improved mechanism, some of the parts being broken away and shown in section.

Fig. 2 is a perspective view of portions of two egg trays, the egg turning device of one tray and a portion of the egg turning mechanism.

Fig. 3 is a vertical section through a portion of a plurality of egg trays and their egg turning devices and a portion of the turning mechanism.

Fig. 4 is a perspective view of the motor which drives the turning mechanism and a portion of the driving connections.

Fig. 5 is a perspective view of a detail of the turning mechanism.

Fig. 6 is a perspective view of other details of the turning mechanism.

Fig. 7 is a view of a detail.

Referring to the drawings, 1 represents the front wall, 2 the rear wall, 4 the side wall, 5 the floor, and 6 the ceiling of the main chamber or casing of an incubator of the mammoth type. In this type of incubator, the egg trays are arranged on each side of a central corridor 8, but in the present case only those trays upon one side of the corridor are shown. The trays are supported upon racks each consisting of front vertical standards 9 and rear vertical standards 9' and spaced horizontal angle irons 10 carried thereby, the outturned horizontal legs of which serve as shelves for the egg trays T, many of the egg trays being omitted from the structure as shown in Fig. 1 for the purpose of more clearly illustrating the turning mechanism. The egg trays are arranged in a plurality of vertical stacks, five stacks being shown in the present instance. All of the trays in each stack are incubating trays, excepting the three lowermost trays which are hatching trays and which are separated from the other trays by horizontal partitions 11.

The egg trays are of the usual type in that they have wire mesh bottoms 12 and in each tray there is placed an egg turning device consisting of a rectangular metal frame 30 connected by a plurality of parallel cross bars 31 between which the eggs are placed; the metal frame 30 being of the same width as the tray but of less length so that it may be reciprocated therein. For the purpose of reciprocating these devices there is provided a plurality of horizontally reciprocable vertically-extending bars 32 all connected together at their upper and lower ends by longitudinally-extending cross-heads 33 and 34, each cross-head being in the form of a channel-shaped bar. The upper cross-head 33 is supported on angle iron members 35 which in turn are connected to and supported by the upper ends of the vertical standards 9 and 9'. The lower cross-head is supported upon angle iron members 36 which support the partitions 11, these angle iron members being likewise carried by the standards 9 and 9'. The vertical bars 32 merely project loosely through apertures 37 in the upper cross-head 33 (Fig. 5) and are supported on the lower cross-head 34 by pins 32' carried by the vertical bars which rest in notches upon the upper surface of saddle 32" which is supported by the cross-head as shown in detail in Fig. 7, the saddle being laterally movable so that by raising the bars 32 slightly, to disengage the pins from the notches and sliding the saddle sidewise, the turning mechanism may be disconnected from the tray turning device for the purpose hereinafter more fully explained.

In the present case there are six of these vertical bars 32, two end bars and four intermediate bars, the intermediate bars extending between the stacks of trays. Each of the egg turning devices 30 is removably connected with two of these bars 32 in the following manner: Extending upwardly from each side of the frame 30 of an egg turning device is an ear 38 which is bent outwardly as indicated at 38' and thence downwardly as indicated at 38", the portion 38" being provided with a vertical slot 39 open at its lower end. Each of the bars 32 is provided with a series of lateral pins 40 extending in opposite directions therefrom for engagement with the slots 39. In order to engage an egg turning device 30 with two of the adjacent vertical bars, it is only necessary to raise the tray T of that device sufficiently to permit the slotted portion 38" to drop over two of the pins 40 of adjacent bars 32 and at the same time when it is desired to remove a tray the turning device thereof may be disengaged from the bars 32 by a similar operation. In this connection it might be explained that the horizontal portion of each of the angle-iron tray supports 10 has an upturned end 10' (Fig. 2) to prevent the tray from reciprocating by friction when the turning device thereof is reciprocated and it is therefore necessary to lift the tray up slightly to clear the stops 10' to remove a tray, which upward movement of the tray is sufficient to disengage the slotted portions 38' of the turning device from the pins.

Reference has heretofore been made to the fact that these bars 32 are supported on the lower cross head 34 by pins 32' which rest upon a movable saddle 32". If it is desired to disconnect the turning mechanism from the turning devices of the trays for any reason, as for instance in the case of breakage, this can be readily accomplished by disengaging the pins 32' from the saddle in the manner heretofore explained which allows all of the bars 32 and their pins 40 to drop sufficiently to bring the pins 40 out of the slots 39 of the portions 38" of the turning devices, whereupon the turning device may be reciprocated individually by hand. The bars are then supported by the pins 32' resting on the bottom of the channel-strapped cross-head 34.

It sometimes happens that one of the turning devices of a tray may be disconnected inadvertently from its adjacent bars 32. In that event, provision is made for automatically engaging that turning device with its bars upon a reciprocating movement of its bars, this being accomplished by providing each of the downturned portions 38" with beveled under edges 41 on each side of the slot 39 so that when a pin 40 contacts one of these beveled edges it will raise the turning device 30 until the pin coincides with the slot 39 after which the turning device drops to its normal position with the pins 40 engaged therewith.

For the purpose of reciprocating the cross-heads and their connected bars 32 to actuate the turning devices 30, the following mechanism is provided: 42 is an electric motor which is located at any suitable point, it being in the present case located on the outside of the rear wall 2. The shaft of this motor is connected by universal coupling 43 with the shaft 44 which has thereon a worm 45 which drives a worm wheel 46 on another shaft 47 arranged at right-angles to the shaft 44 and extending to the front of the incubator. This shaft 47 drives two vertical shafts, a rear vertical shaft 48 and a front vertical shaft 49, these vertical shafts being located in a suitable space at the ends of the egg trays; the shaft 47 being connected with each of these shafts 48 and 49 by beveled gears 50 and 51. Each end of these shafts 48 and 49 is equipped with a pair of worms 52 and 53, one at the upper end and one at the lower end of the shaft. Each one of these worms 52 and 53 of each shaft meshes with a worm wheel 54 which has an eccentric pin 55 upon which is loosely mounted one end of an adjustable connecting rod 56, the other end of this rod having a yoke 57 which is pivotally connected with the vertical drive bars 58 which have a connection with the cross-heads 33 and 34; the bars 58 being connected with these cross-heads by merely loosely extending the bars through apertures in the heads and connecting them therewith by cotter pins 59.

The shaft 60 which is shown in detail in Fig. 6, as being connected with the pinion 50 of the shaft 47 through the beveled gear 61 is merely for the purpose of operating the turning devices on the other side of the incubator which are in all respects a duplicate of the turning devices just described.

The switch controlling the motor is operated by timing mechanism of a well known character (not shown) so that the motor may be operated to impart a reciprocating movement to the mechanism in either one direction or the other at predetermined intervals, the switch being opened by pins 62 located on one of he worm wheels 54 (Fig. 6) after that wheel has made a half revolution.

The horizontal shaft 47, the vertical shafts 48 and 49 and the worm wheels 54 are all supported by a pair of brackets 63 at each end of the trays; each pair of brackets being connected by angle-irons 64 which are suitably secured to the front and rear walls 1 and 2.

A tank 65 is provided with water for humidifying purposes, and a pipe 67 leads from the tank through connections 66 to a scattering disk 68 connected with the shaft of one of the fan motors 69. A magnetic valve 70, controlled by the humidistat 71, regulates the water supply.

Sheet metal baffles 72 are used to cover the space left by trays which have been transferred to the hatching space.

Having thus described my invention I claim:

1. In an incubator having a plurality of superimposed egg trays, a frame-like reciprocatory structure having vertically-extending members arranged at the sides of the trays, means for reciprocating said structure, an egg turning device in each tray, and means for detachably connecting said devices with the vertical members of said structure, said means comprising members connecting with the egg turning devices and projecting over the upper edges of the trays.

2. In an incubator having a plurality of superimposed trays arranged in a plurality of stacks, a frame-like reciprocatory structure having vertically-extending members arranged at the sides of each stack, each interranged at the sides of each stack, each intermediate member being common to two adjacent stacks of trays, means for reciprocating said structure, an egg-turning device in each tray, and means for detachably connecting each device with two adjacent vertical members.

3. In an egg turner for an incubator which has a plurality of egg trays, a reciprocal egg-turning device in each tray, a plurality of vertical bars, means for removably connecting said egg-turning devices with said bars, said means comprising members connecting with the egg-turning devices and projecting over the upper edges of the trays, and means for reciprocating said bars horizontally.

4. In an egg turner for an incubator which has a plurality of egg trays, a reciprocal egg-turning device in each tray, a plurality of vertical bars arranged adjacent the sides of the trays within the incubator chamber, upper and lower cross-heads with which said bars are connected, means for removably connecting said egg-turning devices with said bars, and means for reciprocating said cross-heads and bars in a horizontal direction.

5. In an egg turner for an incubator which has a plurality of egg trays, a reciprocal egg-turning device in each tray, a plurality of vertical bars adjacent the sides of the trays within the incubating chamber, means for removably engaging the egg-turning devices with the bars by raising and lowering movement of said devices, and means for reciprocating said bars horizontally.

6. In an egg turner for an incubator which has a plurality of egg trays, a reciprocal egg-turning device in each tray, a plurality of vertical bars adjacent to trays, means extending over the top edges of the trays for removably connecting said egg-turning devices with said bars by a raising and lowering movement of the trays, means for reciprocating said bars horizontally.

7. In an egg turner for an incubator which has a plurality of egg trays, a reciprocal egg-turning device in each tray, a plurality of vertical bars, means for removably connecting said egg-turning devices with said bars by a movement of said devices, a support for said bars, means for reciprocating said support horizontally, and means for dropping said bars to a limited extent on said support to place said bars out of operative relation with said egg-turning devices.

8. In an egg turner for an incubator which has a plurality of egg trays, a reciprocal egg-turning device in each tray, a plurality of vertical bars, means for reciprocating said bars in a horizontal direction, an ear projecting from each side of each egg-turning device having a slotted portion depending on the outer side of the tray, and a plurality of lateral pins on each bar with which said slotted portions are adapted to engage.

9. In an egg turner for an incubator which has a plurality of superimposed egg trays, a reciprocal egg-turning device in each tray, and means for reciprocating said devices including a horizontal shaft, means for driving said shaft, a pair of vertical shafts, one at each end of the series of trays, geared to said horizontal shaft, and connections between said vertical shafts and the egg-turning devices for imparting a reciprocating movement to said devices.

10. An egg turner for use in an egg tray consisting of a frame having cross bars, means to move the frame consisting of an ear at each side, each ear having an upwardly extending part, an outwardly extending part and a downwardly slotted part, and means engaging the ears in the slots to move the frame.

11. An egg turner for use in an egg tray consisting of a frame having cross bars, means to move the frame consisting of an ear at each side, each ear having an upwardly extending part, an outwardly extending part and a downwardly extending part having a slot therein and a beveled edge on each side of the slot, and means engaging the ears in the slots to move the frame.

12. An egg turner for use in an egg tray consisting of a rectangular frame having a plurality of spaced bars connecting the sides of the frame, an ear at each side of the frame, each ear consisting of an upwardly extending part, an outwardly extending part and a downwardly extending part having a slot therein, and means fitting in the slots to move the frame.

13. In an incubator, in combination with a plurality of stacks of trays, egg turning means in each tray, an ear at each side of each turning means extending down the outside of the tray, and means to engage all of the ears at one time for moving the turning means.

14. In an incubator, in combination with a plurality of stacks of trays, an egg turning frame in each tray, an ear at each side of each turning frame extending down the outside of the tray, each ear having a slot therein, and vertically adjustable means for engaging the ears in the slot to move the frames for turning the eggs in the trays.

15. In an incubator, in combination with a plurality of stacks of trays, an egg turning means in each tray, each turning means having an extension at each side, vertically adjustable means for engaging the extensions, and means to move the vertically adjustable means laterally for moving the egg turning means.

16. In an incubator, in combination with a plurality of spaced stacks of trays, an egg turning frame in each tray, each frame having an ear with a slot therein on each side extending over the side of the tray, a vertically adjustable bar adjacent each side of each stack, each bar having pins therein to engage the ears in the slots, and means to move all of the bars at the same time for moving the turning frames in the trays.

17. In an incubator, in combination with a plurality of spaced stacks of trays, an egg turning frame in each tray, each frame having an ear with a slot therein on each side extending over the side of the tray, a vertically adjustable bar adjacent each side of each stack, each bar having pins therein to engage the ears in the slots, a motor, and means to connect the motor to the bars for moving the frames in the trays.

LA VERNE C. STURGIS.